US010565863B1

(12) United States Patent
Kim et al.

(10) Patent No.: US 10,565,863 B1
(45) Date of Patent: Feb. 18, 2020

(54) METHOD AND DEVICE FOR PROVIDING ADVANCED PEDESTRIAN ASSISTANCE SYSTEM TO PROTECT PEDESTRIAN PREOCCUPIED WITH SMARTPHONE

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/263,006

(22) Filed: Jan. 31, 2019

(51) Int. Cl.
*G08G 1/005* (2006.01)
*G08G 1/07* (2006.01)
*G08G 1/095* (2006.01)
*G08G 1/16* (2006.01)

(52) U.S. Cl.
CPC ............ *G08G 1/005* (2013.01); *G08G 1/07* (2013.01); *G08G 1/095* (2013.01); *G08G 1/166* (2013.01)

(58) Field of Classification Search
CPC .......... G08G 1/005; G08G 1/07; G08G 1/095; G08G 1/166
See application file for complete search history.

(56) References Cited

U.S. PATENT DOCUMENTS

| | | | | |
|---|---|---|---|---|
| 2015/0035685 | A1* | 2/2015 | Strickland | B60Q 9/008 340/901 |
| 2016/0093207 | A1* | 3/2016 | Di Censo | H04R 1/1091 340/944 |
| 2018/0105108 | A1* | 4/2018 | Sugimoto | B60Q 9/008 |
| 2019/0052842 | A1* | 2/2019 | Du | B60R 1/00 |
| 2019/0096230 | A1* | 3/2019 | Tanabe | H04W 4/90 |

* cited by examiner

Primary Examiner — Omer S Khan
(74) Attorney, Agent, or Firm — Xsensus, LLP (57) ABSTRACT

A method for providing an Advanced Pedestrian Assistance System to protect a pedestrian preoccupied with a smartphone is provided. The method includes steps of: the smartphone instructing a locating unit to acquire 1-st information including location and velocity information of the pedestrian and location and velocity information of the smartphone; instructing a detecting unit to acquire 2-nd information including hazard statuses of hazardous areas near the pedestrian and location information and velocity information of hazardous objects, by referring to images acquired by phone cameras linked with the smartphone and the 1-st information; and instructing a control unit to calculate a degree of pedestrian safety of the pedestrian by referring to the 1-st and the 2-nd information, and to transmit a hazard alert to the pedestrian via the smartphone. Further, the method can be used for surveillance or a military purpose.

26 Claims, 7 Drawing Sheets

1-ST SPECIFIC HAZARDOUS OBJECT

METHOD AND DEVICE FOR PROVIDING ADVANCED PEDESTRIAN ASSISTANCE SYSTEM TO PROTECT PEDESTRIAN PREOCCUPIED WITH SMARTPHONE

FIELD OF THE DISCLOSURE

The present disclosure relates to a method for providing an Advanced Pedestrian Assistance System to protect at least one pedestrian preoccupied with at least one smartphone, and a smartphone using the same.

BACKGROUND OF THE DISCLOSURE

Recently, Smombie, or smartphone zombie, is everywhere, and there are many pedestrians who are so focused on their smartphones as to be in danger because they cannot pay attention to their surroundings. Such smombies can be a huge social problem because they can put themselves at risk and be a risk to others.

To protect them, there has been a smartphone application that simply warns the user, for example, when the user stays on the screen for a long period of time when walking. But since it is too simple an application, it cannot warn the user of many dangerous situations that can happen to Smombies.

That is, there is no comprehensive and sophisticated warning system for safety of the smombies and for those around the smombies.

SUMMARY OF THE DISCLOSURE

It is an object of the present disclosure to solve all the aforementioned problems.

It is another object of the present disclosure to provide an Advanced Pedestrian Assistance System to protect at least one pedestrian preoccupied with at least one smartphone, to thereby protect the pedestrian and others around the pedestrian.

In accordance with one aspect of the present disclosure, there is provided a method for providing an Advanced Pedestrian Assistance System to protect at least one pedestrian preoccupied with at least one smartphone, including steps of: (a) the smartphone instructing at least one locating unit to acquire 1-st information including at least part of location information and velocity information of the pedestrian and location information and velocity information of the smartphone, by referring to at least part of information acquired from at least one High Definition Map, at least one GPS, and at least one acceleration sensor and at least one gyroscope sensor included in at least one IMU; (b) the smartphone instructing at least one detecting unit to acquire 2-nd information including each of hazard statuses of each of hazardous areas near the pedestrian and location information and velocity information of hazardous objects, by referring to at least part of images acquired by one or more phone cameras linked with the smartphone and the 1-st information; and (c) the smartphone instructing at least one control unit to calculate at least one degree of pedestrian safety of the pedestrian by referring to the 1-st information and the 2-nd information, and to transmit a hazard alert to the pedestrian via the smartphone.

As one example, the method further includes a step of: (d) the smartphone instructing the control unit to transmit at least part of the 1-st information and the 2-nd information to at least part of connected devices near the pedestrian that include at least one vehicle, at least one CCTV, at least one another smartphone of at least one another pedestrian, and at least one traffic signal all of which are near the pedestrian, wherein at least part of the connected devices are at least part of the hazardous objects.

As one example, at the step of (d), the smartphone instructs the control unit to transmit at least part of the 1-st information and the 2-nd information to at least part of the connected devices near the pedestrian, to thereby allow the connected devices to behave in a direction of lowering a degree of risk of collision between the hazardous objects and the pedestrian, by referring to at least part of the acquired 1-st information and the acquired 2-nd information.

As one example, at the step of (c), the smartphone instructs the control unit to determine the degree of pedestrian safety by additionally referring to 3-rd information, and the 3-rd information includes information on surroundings of the pedestrian generated by the smartphone instructing the control unit to communicate with at least part of connected devices near the pedestrian that include at least one vehicle, at least one CCTV, at least one another smartphone of at least one another pedestrian, and at least one traffic signal all of which are near the pedestrian, wherein at least part of the connected devices are at least part of the hazardous objects.

As one example, the 3-rd information includes at least part of (3_1)-st information and (3_2)-nd information, wherein the (3_1)-st information includes location information and velocity information of a 1-st specific hazardous object included in both of at least one virtual viewing frustum of the phone cameras linked with the smartphone and at least one virtual viewing frustum of at least one external camera linked with the connected devices, and wherein the (3_2)-nd information includes location information and velocity information of a 2-nd specific hazardous object excluded from the virtual viewing frustum of the phone cameras linked with the smartphone but included in the virtual viewing frustum of the external camera linked with the connected devices, and the smartphone instructs the control unit to verify a reliability of the 2-nd information by referring to the (3_1)-st information, and acquire information on at least one undetected hazardous object by referring to the (3_2)-nd information.

As one example, at the step of (c), the smartphone instructs the control unit to generate information on a traffic light of interest of the pedestrian, by referring to (i) traffic light location information and traffic light status information near the pedestrian included in the 3-rd information, and (ii) the location information and the velocity information of the pedestrian included in the 1-st information, and to generate and transmit an additional traffic light notification to the pedestrian via the smartphone by referring to the information on the traffic light of interest.

As one example, the 3-rd information includes (i) a location and a velocity of the vehicle near the pedestrian, (ii) locations and velocities of the hazardous objects near the pedestrian acquired by referring to the CCTV near the pedestrian, (iii) a location and a velocity of said at least one another pedestrian, and (iv) traffic light location information and traffic light status information near the pedestrian.

As one example, the smartphone, if at least one area, on the High Definition Map, corresponding to the images acquired by the phone cameras is detected as less than or equal to a threshold value by using the control unit, instructs the control unit to transmit an unavailability notification of detection to the pedestrian via the smartphone.

As one example, the smartphone determines at least one cause of the area being less than or equal to the threshold value, by referring to at least part of occlusion information, on at least one blocking object interfering with at least one lens of the phone cameras, generated by at least one segmenting unit, and angle information on an angle between a normal vector defining a plane of movement of the pedestrian and a central axis of at least one virtual viewing frustum of the phone cameras in a 3D space whose center lies at the pedestrian, and transmits each of separate warnings according to each corresponding cause to the pedestrian via the smartphone.

As one example, at the step of (c), the smartphone instructs the control unit to determine probabilities of the degree of risk of collision between the pedestrian and the hazardous objects near the pedestrian within a threshold time by referring to the 1-st information and the 2-nd information, to thereby generate the degree of pedestrian safety.

As one example, the smartphone instructs the control unit to transmit an additional notification giving a behavioral guide to the pedestrian for improving the degree of pedestrian safety via the smartphone.

As one example, the smartphone instructs the control unit to (i) generate a pedestrian movement model capable of estimating a change of a moving velocity of the pedestrian, by referring to acceleration sensor information included in the 1-st information, (ii) calculate one or more probabilities of the pedestrian moving into each of nearby areas within the threshold time, by referring to the pedestrian movement model, (iii) generate a hazardous objects movement model capable of estimating changes of moving velocities of the hazardous objects, by referring to at least part of the 2-nd information, (iv) calculate one or more probabilities of the hazardous objects moving into each of nearby areas within the threshold time, by referring to the hazardous objects movement model, and (v) generate the degree of pedestrian safety by referring to the probabilities of the pedestrian and the probabilities of the hazardous objects.

As one example, at the step of (c), the smartphone instructs the control unit to determine whether the pedestrian will move into one of the hazardous areas by referring to the location information and the velocity information of the pedestrian, and information on the hazardous areas, included in the 1-st information and the 2-nd information, to thereby generate the degree of pedestrian safety.

As one example, the smartphone instructs the control unit to (i) generate a pedestrian movement model capable of estimating a change of a moving velocity of the pedestrian, (ii) calculate one or more probabilities of the pedestrian moving into each of nearby areas, by referring to the pedestrian movement model, and (iii) generate the degree of pedestrian safety by referring to the probabilities of the pedestrian and whether each of the nearby areas corresponds to each of the hazardous areas.

As one example, at the step of (b), the smartphone instructs the detecting unit to (i) detect the hazardous objects near the pedestrian in each of the images by using at least one convolutional layer, at least one RPN, and at least one FC layer in the detecting unit, and (ii) acquire the 2-nd information on the detected hazardous objects, by referring to calibration information related to at least one focal length of the phone cameras and the 1-st information.

In accordance with another aspect of the present disclosure, there is provided a smartphone for providing an Advanced Pedestrian Assistance System to protect at least one pedestrian preoccupied with the smartphone, including: at least one memory that stores instructions; and at least one processor configured to execute the instructions to: perform processes of (I) instructing at least one locating unit to acquire 1-st information including at least part of location information and velocity information of the pedestrian and location information and velocity information of the smartphone, by referring to at least part of information acquired from at least one High Definition Map, at least one GPS, and at least one acceleration sensor and at least one gyroscope sensor included in at least one IMU, (II) instructing at least one detecting unit to acquire 2-nd information including each of hazard statuses of each of hazardous areas near the pedestrian and location information and velocity information of hazardous objects, by referring to at least part of images acquired by one or more phone cameras linked with the smartphone and the 1-st information, and (III) instructing at least one control unit to calculate at least one degree of pedestrian safety of the pedestrian by referring to the 1-st information and the 2-nd information, and to transmit a hazard alert to the pedestrian via the smartphone.

As one example, the processor further performs a process of: (IV) instructing the control unit to transmit at least part of the 1-st information and the 2-nd information to at least part of connected devices near the pedestrian that include at least one vehicle, at least one CCTV, at least one another smartphone of at least one another pedestrian, and at least one traffic signal all of which are near the pedestrian, wherein at least part of the connected devices are at least part of the hazardous objects.

As one example, at the process of (IV), the processor instructs the control unit to transmit at least part of the 1-st information and the 2-nd information to at least part of the connected devices near the pedestrian, to thereby allow the connected devices to behave in a direction of lowering a degree of risk of collision between the hazardous objects and the pedestrian, by referring to at least part of the acquired 1-st information and the acquired 2-nd information.

As one example, at the process of (III), the processor instructs the control unit to determine the degree of pedestrian safety by additionally referring to 3-rd information, and the 3-rd information includes information on surroundings of the pedestrian generated by the processor instructing the control unit to communicate with at least part of connected devices near the pedestrian that include at least one vehicle, at least one CCTV, at least one another smartphone of at least one another pedestrian, and at least one traffic signal all of which are near the pedestrian, wherein at least part of the connected devices are at least part of the hazardous objects.

As one example, the 3-rd information includes at least part of (3_1)-st information and (3_2)-nd information, wherein the (3_1)-st information includes location information and velocity information of a 1-st specific hazardous object included in both of at least one virtual viewing frustum of the phone cameras linked with the smartphone and at least one virtual viewing frustum of at least one external camera linked with the connected devices, and wherein the (3_2)-nd information includes location information and velocity information of a 2-nd specific hazardous object excluded from the virtual viewing frustum of the phone cameras linked with the smartphone but included in the virtual viewing frustum of the external camera linked with the connected devices, and the processor instructs the control unit to verify a reliability of the 2-nd information by referring to the (3_1)-st information, and acquire information on at least one undetected hazardous object by referring to the (3_2)-nd information.

As one example, at the process of (III), the processor instructs the control unit to generate information on a traffic light of interest of the pedestrian, by referring to (i) traffic light location information and traffic light status information near the pedestrian included in the 3-rd information, and (ii) the location information and the velocity information of the pedestrian included in the 1-st information, and to generate and transmit an additional traffic light notification to the pedestrian via the smartphone by referring to the information on the traffic light of interest.

As one example, the 3-rd information includes (i) a location and a velocity of the vehicle near the pedestrian, (ii) locations and velocities of the hazardous objects near the pedestrian acquired by referring to the CCTV near the pedestrian, (iii) a location and a velocity of said at least one another pedestrian, and (iv) traffic light location information and traffic light status information near the pedestrian.

As one example, the processor, if at least one area, on the High Definition Map, corresponding to the images acquired by the phone cameras is detected as less than or equal to a threshold value by using the control unit, instructs the control unit to transmit an unavailability notification of detection to the pedestrian via the smartphone.

As one example, the processor determines at least one cause of the area being less than or equal to the threshold value, by referring to at least part of occlusion information, on at least one blocking object interfering with at least one lens of the phone cameras, generated by at least one segmenting unit, and angle information on an angle between a normal vector defining a plane of movement of the pedestrian and a central axis of at least one virtual viewing frustum of the phone cameras in a 3D space whose center lies at the pedestrian, and transmits each of separate warnings according to each corresponding cause to the pedestrian via the smartphone.

As one example, at the process of (III), the processor instructs the control unit to determine probabilities of the degree of risk of collision between the pedestrian and the hazardous objects near the pedestrian within a threshold time by referring to the 1-st information and the 2-nd information, to thereby generate the degree of pedestrian safety.

As one example, the processor instructs the control unit to transmit an additional notification giving a behavioral guide to the pedestrian for improving the degree of pedestrian safety via the smartphone.

As one example, the processor instructs the control unit to (i) generate a pedestrian movement model capable of estimating a change of a moving velocity of the pedestrian, by referring to acceleration sensor information included in the 1-st information, (ii) calculate one or more probabilities of the pedestrian moving into each of nearby areas within the threshold time, by referring to the pedestrian movement model, (iii) generate a hazardous objects movement model capable of estimating changes of moving velocities of the hazardous objects, by referring to at least part of the 2-nd information, (iv) calculate one or more probabilities of the hazardous objects moving into each of nearby areas within the threshold time, by referring to the hazardous objects movement model, and (v) generate the degree of pedestrian safety by referring to the probabilities of the pedestrian and the probabilities of the hazardous objects.

As one example, at the process of (III), the processor instructs the control unit to determine whether the pedestrian will move into one of the hazardous areas by referring to the location information and the velocity information of the pedestrian, and information on the hazardous areas, included in the 1-st information and the 2-nd information, to thereby generate the degree of pedestrian safety.

As one example, the processor instructs the control unit to (i) generate a pedestrian movement model capable of estimating a change of a moving velocity of the pedestrian, (ii) calculate one or more probabilities of the pedestrian moving into each of nearby areas, by referring to the pedestrian movement model, and (iii) generate the degree of pedestrian safety by referring to the probabilities of the pedestrian and whether each of the nearby areas corresponds to each of the hazardous areas.

As one example, at the process of (II), the processor instructs the detecting unit to (i) detect the hazardous objects near the pedestrian in each of the images by using at least one convolutional layer, at least one RPN, and at least one FC layer in the detecting unit, and (ii) acquire the 2-nd information on the detected hazardous objects, by referring to calibration information related to at least one focal length of the phone cameras and the 1-st information.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
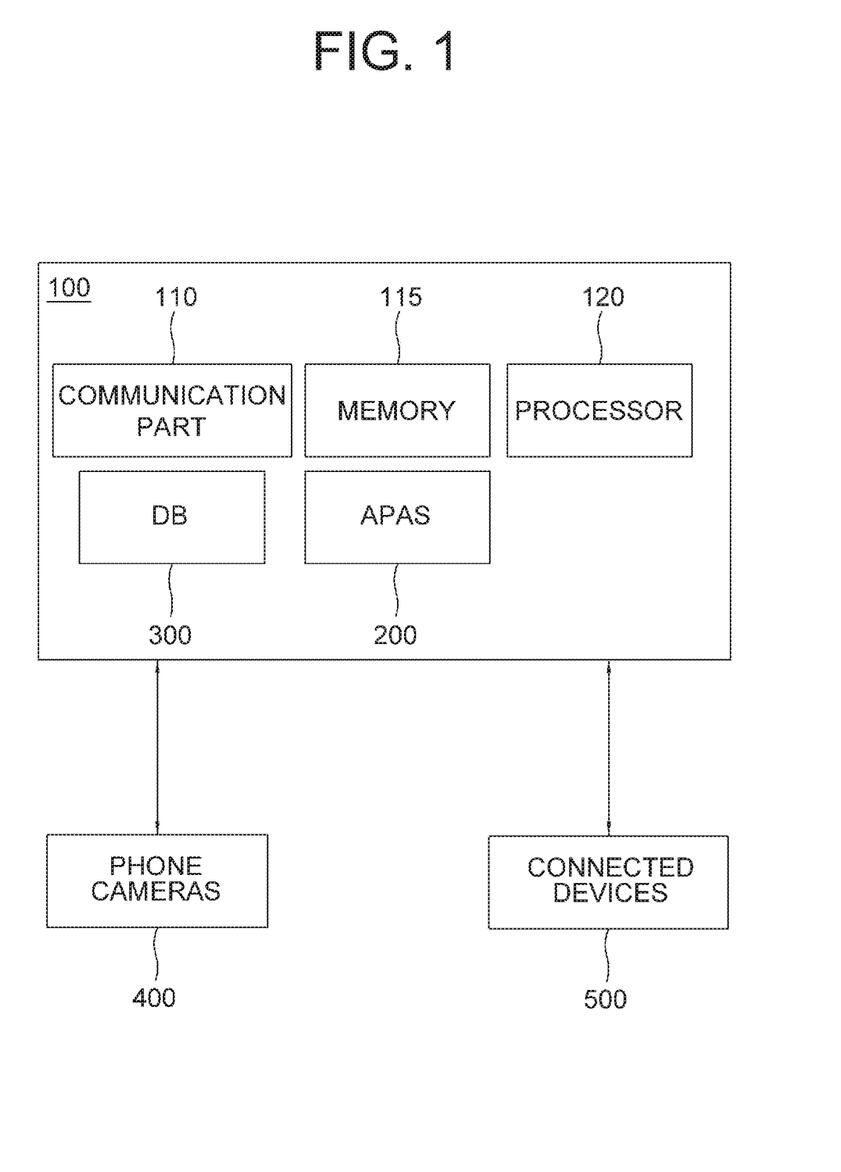
FIG. 1 is a drawing schematically illustrating a configuration of at least one smartphone for providing an Advanced Pedestrian Assistance System to protect at least one pedestrian preoccupied with the smartphone in accordance with one example embodiment of the present disclosure.

FIG. 1 is a drawing schematically illustrating a configuration of at least one smartphone for providing an Advanced Pedestrian Assistance System to protect at least one pedestrian preoccupied with the smartphone in accordance with one example embodiment of the present disclosure.

By referring to FIG. 1, the smartphone 100 may include the Advanced Pedestrian Assistance System 200 and at least one DB 300, which are components to be described in detail later. The Advanced Pedestrian Assistance System 200 is referred to as the APAS 200 below. Processes of input, output and computation of the APAS 200 and the DB 300 may be respectively performed by a communication part 110 and a processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the smartphone 100 does not exclude an integrated device including any combination of a processor, a memory, a medium, or any other computing components.

Also, the smartphone 100 may exchange data with one or more phone cameras 400 and one or more connected devices 500, and this process is explained along with the APAS 200 in detail later.

Figure 2:
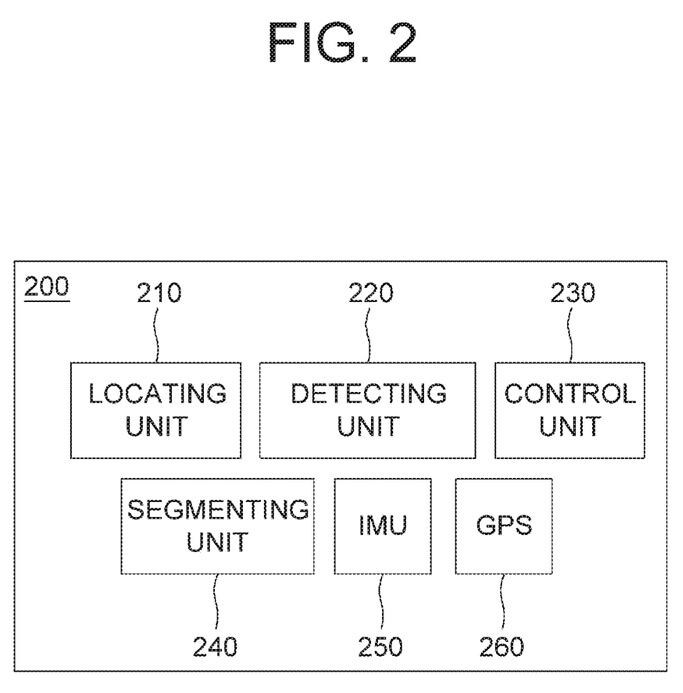
FIG. 2 is a drawing schematically illustrating a configuration of the Advanced Pedestrian Assistance System to protect the pedestrian preoccupied with the smartphone in accordance with one example embodiment of the present disclosure.

FIG. 2 is a drawing schematically illustrating a configuration of the Advanced Pedestrian Assistance System to protect the pedestrian preoccupied with the smartphone in accordance with one example embodiment of the present disclosure.

APAS 200 may include at least one locating unit 210, at least one detecting unit 220, at least one control unit 230, at least one segmenting unit 240, at least one IMU (Inertial Measurement Unit) 250, and at least one GPS (Global Positioning System) 260. As will be explained later, basically the IMU 250 may generate sensor information that can be inputted into each of the units above, and the locating unit 210, the detecting unit 220 and the control unit 230 may protect the pedestrian who uses the smartphone 100, by using information generated from the GPS 260, one or more images acquired from the phone cameras 400, and information acquired from the connected devices 500, as well as the sensor data. The segmenting unit 240 may be used for detecting whether any object is blocking a view of the phone cameras 400, to be described later.

A general configuration of the smartphone 100 and the APAS 200 included therein is described above, and detailed operation of the APAS 200 is described below.

First, the smartphone 100 may instruct the locating unit 210 to acquire information of the High Definition Map in the DB 300, location information from the GPS 260, and sensor data from the IMU 250. The sensor data from the IMU 250 may include information generated by sensors capable of measuring inertia of the smartphone 100, for example, at least one acceleration sensor or at least one gyroscope sensor. If such information is acquired, the smartphone 100 may instruct the locating unit 210 to acquire 1-st information including at least part of location information and velocity information of the pedestrian using the smartphone 100, and location information and velocity information of the smartphone 100, by referring to at least part of the information acquired from the High Definition Map, the GPS, and the acceleration sensor and the gyroscope sensor included the IMU.

In many cases, the location information of the pedestrian will be similar to the location information of the smartphone, and the velocity information of the pedestrian will be similar to the velocity information of the smartphone. But in some cases, a difference between moving velocities of the smartphone 100 and the pedestrian is so large that a correction may be needed. A process for such correction is described below.

First, the smartphone 100 may instruct the locating unit 220 to calculate each distance of each of eyes of the pedestrian from a crossing point between a line connecting the eyes and a line passing through a nose of the pedestrian, by using the images acquired by the phone cameras 400, and to calculate an angle representing how much the smartphone 100 is leaning away from a body of the pedestrian by referring to a ratio between said each distance. This may be calculated by referring to a Gaussian distribution model representing a relation between the angle and the ratio. Thereafter, the velocity information of the pedestrian may be calculated by integrating the velocity information of the smartphone and a vector corresponding to the angle.

Thereafter, the smartphone 100 may instruct the detecting unit 220 to acquire 2-nd information including each of hazard statuses of each of hazardous areas near the pedestrian and location information and velocity information of hazardous objects, by referring to at least part of the images acquired by phone cameras 400 linked with the smartphone 100 and the 1-st information. The hazardous areas may mean areas that can be dangerous for the pedestrian, for example, a road or an area near a construction site. The hazardous objects may mean every object that can collide with the pedestrian, near the pedestrian. This includes other pedestrians as well as objects like vehicles, street lights, and utility poles. Operations on at least part of the images and the 1-st information for acquisition of the 2-nd information are described below.

First, the detecting unit 220 may be comprised of a CNN, and may acquire the 2-nd information by at least one neural network operation. That is, the detecting unit 220 may detect the objects near the pedestrian included in each of the images acquired by the phone cameras 400, by using at least one convolutional layer, at least one RPN, and at least one FC layer. Thereafter, the 2-nd information may be acquired by using the location information and the velocity information of the hazardous objects, by referring to calibration information related to a focal length of the phone cameras 400 and the location information and the velocity speed information of the smartphone included in the 1-st information.

Upon close look at a process of acquiring the location information of the hazardous objects, the detecting unit 220 may acquire location information of the phone cameras 400 linked with the smartphone 100 by referring to the location information of the smartphone. Specifically, a type or a model of the smartphone 100 may be identified, and information on how far the phone cameras 400 are located from a center of the smartphone 100 may be acquired by referring to a design of the smartphone 100, then the location information of the phone cameras 400 may be calculated by referring to the location information of the smartphone and the acquired information on how far the phone cameras 400 are located. If the location information of the phone cameras 400 is acquired, each of 2D distances of each of the hazardous objects from each center of each of the images may be calculated, each of 3D distances of each of the hazardous objects from the phone cameras 400 may be calculated by additionally referring to the focal length, and the location information of each of the hazardous objects may be acquired by referring to the 3D distances and the location information of the phone cameras 400.

After calculating each of relative velocities between the phone cameras 400 and the hazardous objects by referring to the multiple images, acquired consecutively by the phone cameras 400, the velocity information of the hazardous objects may be calculated by referring to each of the relative velocities and velocity information on the phone cameras 400 calculated by using the velocity information of the smartphone.

After acquisition of the location information and the velocity information of the hazardous objects, the smartphone 100 may instruct the control unit 230 to generate at least one degree of pedestrian safety by referring to the 1-st information and the 2-nd information, and transmit a hazard alert to the pedestrian via the smartphone 100 by referring to the degree of pedestrian safety.

The hazardous areas and the hazardous objects are taken into consideration when generating the degree of pedestrian safety, and a process for the hazardous areas is described.

The smartphone 100 may instruct the control unit 230 to determine whether the pedestrian will move into one of the hazardous areas by referring to the location information and the velocity information of the pedestrian, and information on the hazardous areas, included in the 1-st information and the 2-nd information, to thereby generate the degree of pedestrian safety. Specifically, the smartphone 100 may instruct the control unit 230 to (i) generate a pedestrian movement model capable of estimating a change of a moving velocity of the pedestrian, (ii) calculate one or more probabilities of the pedestrian moving into each of nearby areas, by referring to the pedestrian movement model, and (iii) generate the degree of pedestrian safety by referring to the probabilities of pedestrian movement and whether each of the nearby areas corresponds to each of the hazardous areas.

The pedestrian movement model may include two detailed models one of which estimates the moving speed of the pedestrian and the other of which estimates a moving direction of the pedestrian. The detailed model for estimation of the moving speed of the pedestrian may be a Gaussian distribution model which is a specific first distribution having a mean value of a change of acceleration of 0 and a predetermined variance, with an absolute value of the acceleration of the pedestrian generated by the acceleration sensor in the IMU 250 as a reference point. The detailed model for estimation of the moving direction of the pedestrian may be a specific second distribution having a mean value of a change of the moving direction of 0 and a predetermined variance, with information on the moving direction included in the acceleration of the pedestrian as a reference point. Examples of the process are described by referring to FIG. 3.

Figure 3:
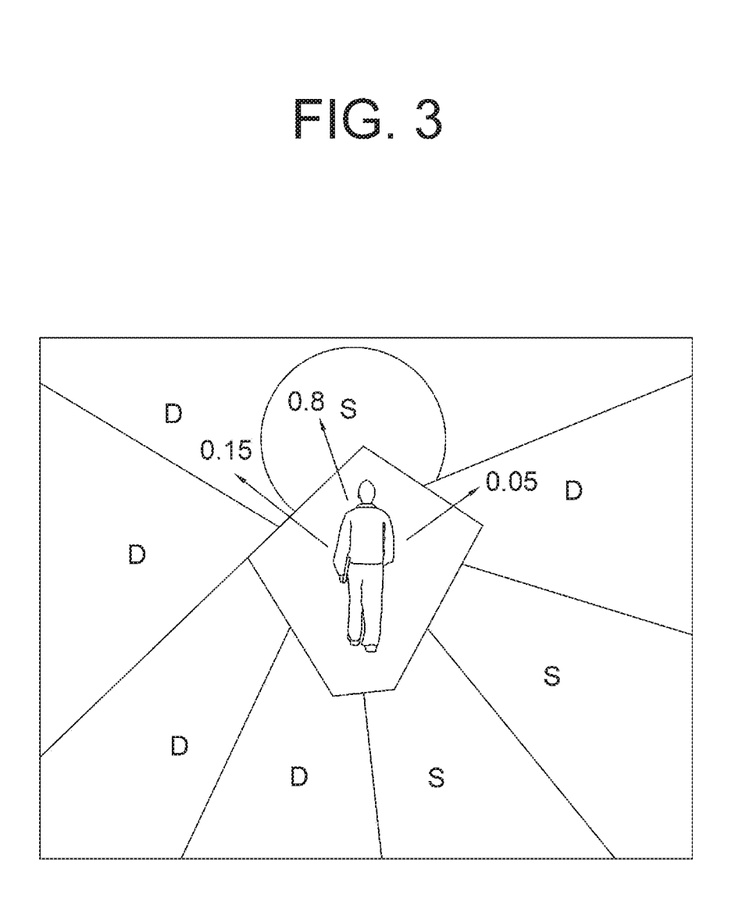
FIG. 3 is a drawing schematically illustrating a process of calculating at least one degree of pedestrian safety by referring to one or more probabilities of the pedestrian moving into each of nearby areas, performed by the Advanced Pedestrian Assistance System to protect the pedestrian preoccupied with the smartphone in accordance with one example embodiment of the present disclosure.

FIG. 3 is a drawing schematically illustrating a process of calculating the degree of pedestrian safety by referring to the probabilities of the pedestrian moving into each of nearby areas, performed by the Advanced Pedestrian Assistance System to protect the pedestrian preoccupied with the smartphone in accordance with one example embodiment of the present disclosure.

By referring to FIG. 3, the probabilities of the pedestrian moving into nearby areas are calculated by the processes above. According to the distribution model above, a probability of the pedestrian moving with an initial speed and an initial direction will be the highest, therefore the probability of moving into an area in the front may be calculated as 0.8, and each probability of moving into areas on the left and right may be calculated as 0.15 and 0.05. A letter S of FIG. 3 may mean the area is safe, and a letter D may mean the area is dangerous, and in the example of FIG. 3, the probability of the pedestrian moving into the hazardous areas is relatively low at 0.2, then the APAS 200 may estimate the degree of pedestrian safety as somewhat high.

The process of calculating the degree of pedestrian safety by referring to the hazardous areas is described above, and a process of calculating the degree of pedestrian safety by referring to the hazardous objects is described below.

The smartphone 100 may instruct the control unit 230 to determine probabilities of at least one degree of risk of collision between the pedestrian and the hazardous objects near the pedestrian within a threshold time by referring to the 1-st information and the 2-nd information, to thereby generate the degree of pedestrian safety. Specifically, the smartphone 100 may instruct the control unit 230 to generate a hazardous objects movement model capable of estimating changes of moving velocities of the hazardous objects and the pedestrian movement model as aforementioned. And both probabilities of the pedestrian moving into each of nearby areas within the threshold time by referring to the pedestrian movement model, and probabilities of the hazardous objects moving into each of nearby areas within the threshold time by referring to the hazardous objects movement model, may be calculated. Thereafter, the degree of pedestrian safety may be generated by referring to the probabilities of the pedestrian movement and the probabilities of the hazardous objects movement.

The hazardous objects movement model may be generated in the way similar to generation of the pedestrian movement model, by referring to the location information and the velocity information of the hazardous objects included in the 2-nd information.

The probabilities of the pedestrian movement and the probabilities of the hazardous object movement may be functions of time representing respective probabilities of the pedestrian and the hazardous objects being present at each position, and the control unit 230 may generate the degree of pedestrian safety by referring to a result of integration of multiplications of the two respective probabilities over the threshold time. Examples of the processes are decreased by referring to FIG. 4.

Figure 4:
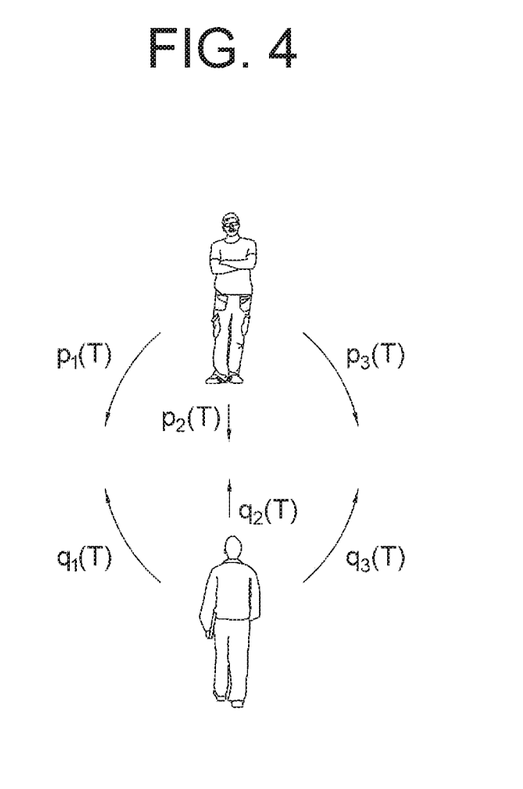
FIG. 4 is a drawing schematically illustrating a process of calculating the degree of pedestrian safety by referring to probabilities of a degree of risk of collision between the pedestrian and one or more hazardous objects, performed by the Advanced Pedestrian Assistance System to protect the pedestrian preoccupied with the smartphone in accordance with one example embodiment of the present disclosure.

FIG. 4 is a drawing schematically illustrating a process of calculating the degree of pedestrian safety by referring to the probabilities of the degree of risk of collision between the pedestrian and the hazardous objects, performed by the Advanced Pedestrian Assistance System to protect the pedestrian preoccupied with the smartphone in accordance with one example embodiment of the present disclosure.

By referring to FIG. 4, each of the probabilities of the pedestrian movement is $p_1(t), p_2(t)$, and $p_3(t)$, and each of the corresponding probabilities of the hazardous object movement is $q_1(t), q_2(t)$, and $q_3(t)$. Herein, the control unit 230 may multiply each probabilities and integrate them. Its formula is as follows.

$$\int_0^T p_1(t)q_1(t) + p_2(t)q_2(t) + p_3(t)q_3(t) dt$$

T in the above formula may be the threshold time.

The result of the integration may represent the degree of risk of collision between the pedestrian and the hazardous objects, and the control unit 230 may calculate the degree of pedestrian safety by referring to the degree of risk of collision.

Herein, if the degree of pedestrian safety is calculated to be low due to the hazardous objects, a behavior for improving the degree of pedestrian safety may be suggested, in addition to a notification, to the pedestrian. That is, the smartphone 100 may instruct the control unit 230 to transmit an additional notification giving a behavioral guide to the pedestrian for evading the hazardous objects. For example, if one of the hazardous objects is moving in a first specific direction, the behavioral guide for moving in a second specific direction may be given to the pedestrian to avoid it.

As such, the smartphone 100 may instruct the control unit 230 to calculate the degree of pedestrian safety, to thereby provide safety of the pedestrian. However, in the description above, the degree of pedestrian safety is calculated by using only information generated by the smartphone 100 itself and its phone cameras 400, therefore it is easily anticipated that calculation of the degree of pedestrian safety using additional information acquired from connected devices 500 near the pedestrian will make the pedestrian safer. Accordingly, a process of using information acquired from the connected devices 500 is described below.

That is, the smartphone 100 may instruct the control unit 230 to calculate the degree of pedestrian safety by referring to 3-rd information. Herein, the 3-rd information may include information on surroundings of the pedestrian generated by the smartphone 100 instructing the control unit 230 to communicate with at least part of connected devices near the pedestrian that include at least one vehicle, at least one CCTV, at least one another smartphone of at least one another pedestrian, and at least one traffic signal all of which are near the pedestrian, where at least part of the connected devices may be at least part of the hazardous objects. For example, the 3-rd information may include the location information and the velocity information of the hazardous objects shown in videos generated by the CCTV.

The 3-rd information may include two types of detailed information one of which is (3_1)-st information and the other of which is (3_2)-nd information.

The (3_1)-st information may include location information and velocity information of a 1-st specific hazardous object included in both of at least one virtual viewing frustum of the phone cameras 400 linked with the smartphone 100 and at least one virtual viewing frustum of at least one external camera linked with the connected devices 500, and the (3_2)-nd information may include location information and velocity information of a 2-nd specific hazardous object excluded from the virtual viewing frustum of the phone cameras 400 linked with the smartphone 100 but included in the virtual viewing frustum of the external camera linked with the connected devices 500.

The (3_1)-st information and the (3_2)-nd information may play different roles and specifically the smartphone 100 may instruct the control unit 230 to verify a reliability of the 2-nd information, created by the smartphone 100, by referring to the (3_1)-st information, and acquire information on at least one undetected hazardous object, which the smartphone 100 did not detect, by referring to the (3_2)-nd information. The degree of pedestrian safety becomes more accurate by using the (3_1)-st information, and more information is utilized for the degree of pedestrian safety by using the (3_2)-nd information. Examples of the (3_1)-st information and the (3_2)-nd information are described by referring to FIGS. 5A and 5B.

Figure 5A:
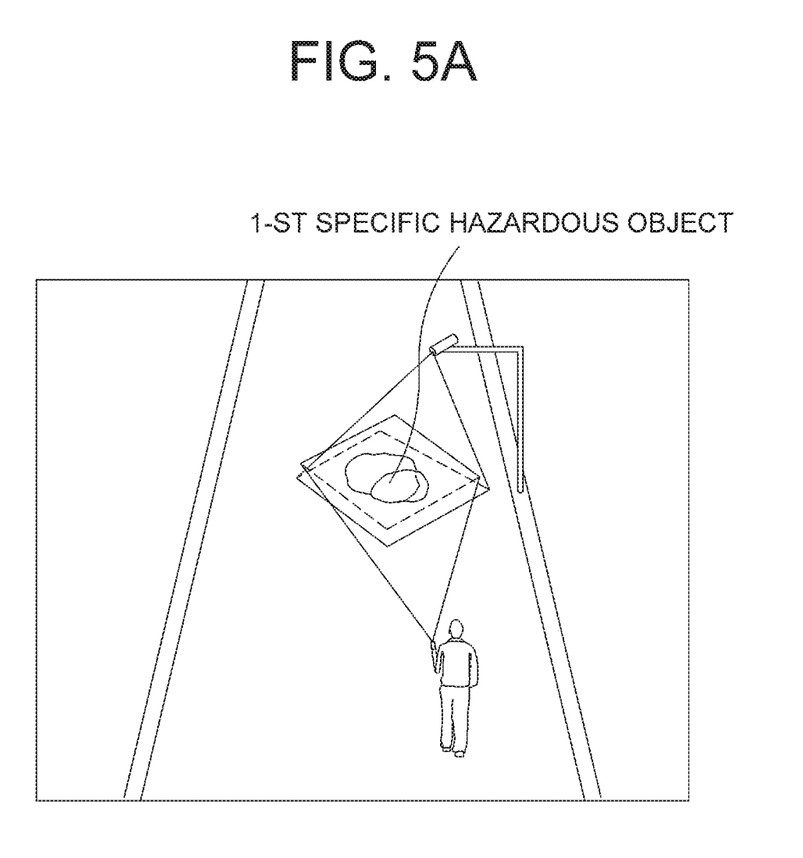
FIGS. 5A and 5B are drawings schematically illustrating a situation related to (3_1)-st information and (3_2)-nd information acquired by the Advanced Pedestrian Assistance System to protect the pedestrian preoccupied with the smartphone in accordance with one example embodiment of the present disclosure.
Figure 5B:
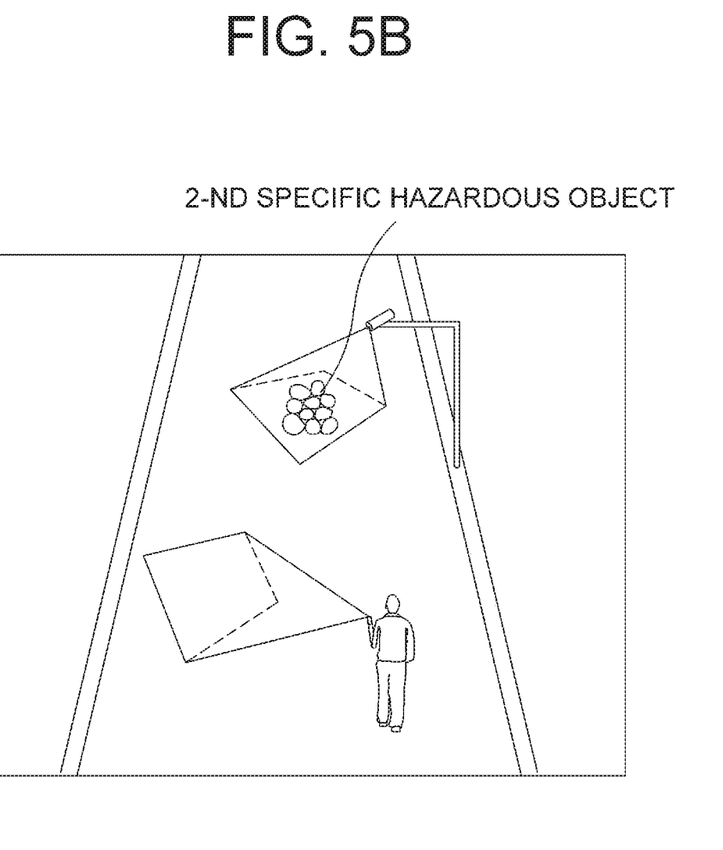

FIGS. 5A and 5B are drawings schematically illustrating a situation related to the (3_1)-st information and the (3_2)-nd information acquired by the Advanced Pedestrian Assistance System to protect the pedestrian preoccupied with the smartphone in accordance with one example embodiment of the present disclosure.

FIG. 5A shows an example of the situation related to the (3_1)-st information, and the 1-st specific hazardous object is shown as detected by both of the phone cameras 400 linked with the smartphone 100 and the camera linked with the CCTV. In this case, the 2-nd information acquired by the smartphone 100 via the detecting unit 220 may be verified by using the 3-rd information on the 1-st specific hazardous object.

FIG. 5B shows an example of the situation related to the (3_2)-nd information, and the 2-nd specific hazardous object is shown as detected by the camera linked with the CCTV but not by the phone cameras 400 linked with the smartphone 100. Herein, the 2-nd information does not include any information on the 2-nd specific hazardous object, therefore the smartphone 100 may additionally acquire the information on the 2-nd specific hazardous object by referring to the (3_2)-nd information.

Also, the smartphone 100 may instruct the control unit 230 to give information on the traffic light, as well as the hazard alert by referring to the degree of pedestrian safety, as described below.

That is, the smartphone 100 may instruct the control unit 230 to generate information on a traffic light of interest of the pedestrian, by referring to (i) traffic light location information and traffic light status information near the pedestrian included in the 3-rd information, and (ii) the location information and the velocity information of the pedestrian included in the 1-st information, and to generate and transmit an additional traffic light notification to the pedestrian via the smartphone 100 by referring to the information on the traffic light of interest. Specifically, the control unit 230 may generate a virtual route for the pedestrian by referring to the location information and the velocity information of the pedestrian, and acquire the traffic light location information and the traffic light status information near the virtual route of the pedestrian by referring to the 3-rd information.

As such, the smartphone 100 may use information acquired from the connected devices 500. Conversely, the connected devices 500 may use information generated by the smartphone 100.

That is, the smartphone 100 may instruct the control unit 230 to transmit at least part of the 1-st information and the 2-nd information to at least part of the connected devices 500 near the pedestrian. As such, the smartphone 100 may allow the connected devices to behave in a direction of lowering the degree of risk of collision between the hazardous objects and the pedestrian, by referring to at least part of the acquired 1-st information and the acquired 2-nd information. Among the connected devices 500, some objects identical or similar to the smartphone 100 may utilize at least part of the 1-st information and the 2-nd information in the way similar to the smartphone 100 uses the 3-rd information.

Meanwhile, to allow the smartphone 100 to provide such the APAS 200 to the pedestrian, acquisition of sufficient information by using the phone cameras 400 is required, but it may not be possible due to usage pattern of the smartphone 100 by the pedestrian. In this case, the pedestrian needs to be notified of the situation and his/her behavior must be corrected, as described below.

That is, if at least one area, on the High Definition Map, corresponding to the images acquired by the phone cameras 400 is detected as less than or equal to a threshold value by using the control unit 230, the smartphone 100 may instruct the control unit 230 to transmit an unavailability notification of detection to the pedestrian via the smartphone 100. This is because the area, corresponding to the images acquired by the phone cameras 400, on the High Definition Map must be large for acquisition of information on more of the hazardous objects by the smartphone 100.

However, if the area on the High Definition Map is determined as falling below the threshold value, then at least one lens of the phone cameras 400 may be blocked by at least one object, e.g., a finger, or the pedestrian may be holding the smartphone 100 almost paralleled to the ground. Solutions for the two cases differ, and a method for distinguishing the two is need, as described below.

Specifically, the smartphone 100 may determine at least one cause of the area on the High Definition Map being less than or equal to the threshold value, by referring to at least part of occlusion information, due to at least one blocking object interfering with at least one lens of the phone cameras, generated by at least one segmenting unit 240, and angle information on an angle between a normal vector defining a plane of movement of the pedestrian and a central axis of at least one virtual viewing frustum of the phone cameras in a 3D space whose center lies at the pedestrian. Thereafter, each of separate warnings according to each corresponding cause may be transmitted to the pedestrian via the smartphone.

The segmenting unit 240 may segment, by pixel, at least one region on the images acquired by the phone cameras 400, to thereby determine whether there is any blocking object interfering with the lens. This may be comprised of the CNN which may have calculated one or more losses by referring to inputted images having the blocking object, inputted images not having the blocking object, and their corresponding GTs, to thereby learn parameters of the CNN by backpropagating the losses.

The angle information may be generated by referring to information created by the acceleration sensor and the gyroscope sensor in the IMU 250. A process of utilizing the angle information is described by referring to FIG. 6.

Figure 6:
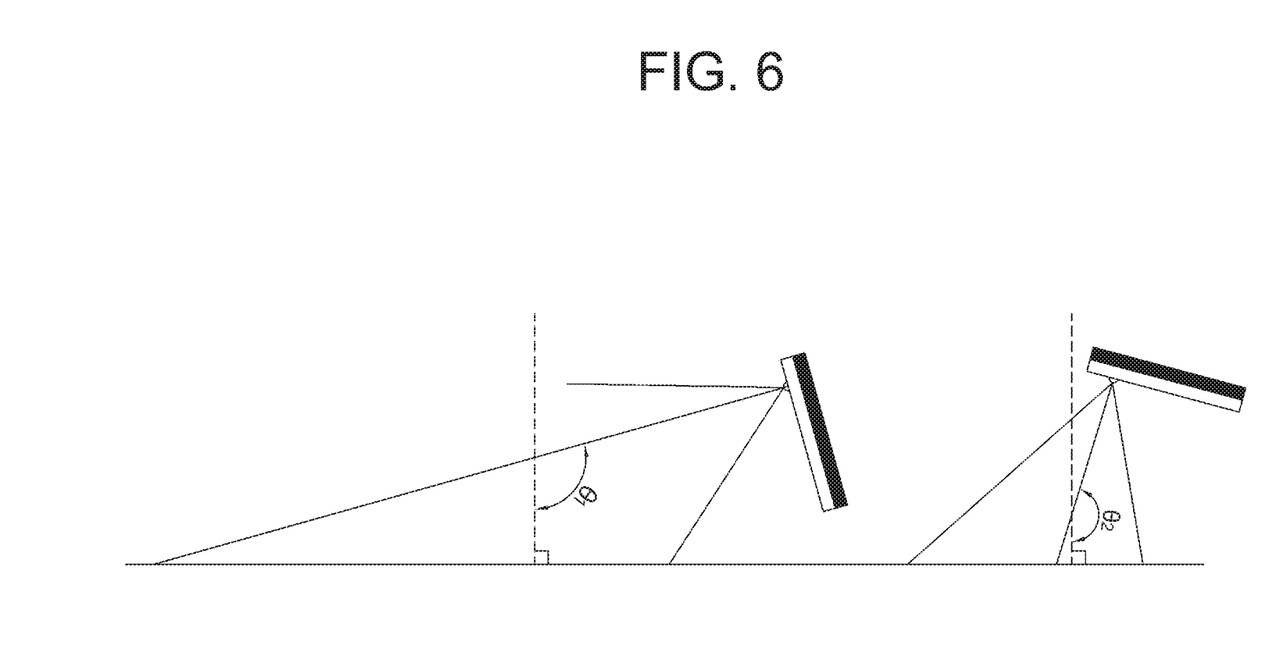
FIG. 6 is a drawing schematically illustrating angle information between each of central axes of viewing frustums from phone cameras and the ground, used by the Advanced Pedestrian Assistance System to protect the pedestrian preoccupied with the smartphone in accordance with one example embodiment of the present disclosure.

FIG. 6 is a drawing schematically illustrating the angle information between each of central axes of viewing frustums from the phone cameras and the ground, used by the Advanced Pedestrian Assistance System to protect the pedestrian preoccupied with the smartphone in accordance with one example embodiment of the present disclosure.

By referring to the FIG. 6, if an angle $\theta_2$ between a normal vector defining a plane of movement of the pedestrian and a central axis of the virtual viewing frustum of the phone camera in a 3D space whose center lies at the pedestrian is large, the virtual viewing frustum will cover a small surface on the ground, and if the angle $\theta_1$ is small, the virtual viewing frustum will cover a large surface on the ground.

Therefore, if the area is small and the angle $\theta_2$ is larger than a threshold angle, it means that the pedestrian is holding the smartphone 100 almost parallel to the ground, thus the smartphone 100 may instruct the control unit 230 to transmit a notification telling the pedestrian to hold the smartphone 100 in a tilted position to the pedestrian via the smartphone 100. Conversely, if the area is small and the angle $\theta_1$ is smaller than the threshold angle, and if the blocking object is occupying an area, on the images, larger than a threshold area by referring to the occlusion information generated by the segmenting unit 240, then the smartphone 100 may instruct the control unit 230 to transmit a notification telling the pedestrian to remove the blocking object.

By providing the APAS in the comprehensive and sophisticated way as above, the safety of the pedestrian is guaranteed.

As can be understood by those skilled in the art, it is clear that communication parts of the smartphone may perform transmission of image data, for example, images described above like the original image, original labels, and additional labels, etc., and that processors and/or memories of the smartphone may retain data for feature maps and performing operations, and that the processors of the smartphone may perform convolution operations, deconvolution operations, and loss value operations, but the scope of the present disclosure is not limited thereto.

The present disclosure has an effect providing the Advanced Pedestrian Assistance System to protect the pedestrian preoccupied with the smartphone, to thereby protect the pedestrian and others around the pedestrian.

The method in accordance with the present disclosure can be used for surveillance or a military purpose.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing an Advanced Pedestrian Assistance System to protect a pedestrian preoccupied with a smartphone, comprising steps of:
   (a) the smartphone instructing a locating unit to infer 1-st information including location information and velocity information of the pedestrian by acquiring associated location information and velocity information of the smartphone, by referring to information acquired from a High Definition Map, Global Positioning system (GPS), and an acceleration sensor and a gyroscope sensor included in an Inertial Measurement Unit (IMU);
   (b) the smartphone instructing a detecting unit to acquire 2-nd information including each of hazard statuses of each of hazardous areas near the pedestrian and location information and velocity information of hazardous objects, by referring to images acquired by one or more smartphone cameras linked with the smartphone and the 1-st information; and
   (c) the smartphone instructing a control unit to calculate a degree of pedestrian safety of the pedestrian by referring to the 1-st information and the 2-nd information, and to transmit a hazard alert to the pedestrian via the smartphone, wherein
   at step (b), the smartphone instructs the detecting unit to (i) detect the hazardous objects near the pedestrian in each of the images by using a convolutional layer, a Region Proposal Network (RPN), and a Fully Connected (FC) layer in the detecting unit, and (ii) acquire the 2-nd information on the detected hazardous objects, by referring to calibration information related to a focal length of the one or more smartphone cameras and the 1-st information;
   (d) the smartphone instructing the control unit to transmit the 1-st information and the 2-nd information to connected devices near the pedestrian that include a vehicle, a closed caption television (CCTV), another smartphone of another pedestrian, and a traffic signal all of which are near the pedestrian, wherein the connected devices are the hazardous objects.

2. The method of claim 1, wherein, at the step of (d), the smartphone instructs the control unit to transmit the 1-st information and the 2-nd information to the connected devices near the pedestrian, to thereby allow the connected devices to behave in a direction of lowering a degree of risk of collision between the hazardous objects and the pedestrian, by referring to the acquired 1-st information and the acquired 2-nd information.

3. A method for providing an Advanced Pedestrian Assistance System to protect a pedestrian preoccupied with a smartphone, comprising steps of:
   (a) the smartphone instructing a locating unit to infer 1-st information including location information and velocity information of the pedestrian by acquiring associated location information and velocity information of the smartphone, by referring to information acquired from a High Definition Map, Global Positioning system (GPS), and an acceleration sensor and a gyroscope sensor included in an Inertial Measurement Unit (IMU);
   (b) the smartphone instructing a detecting unit to acquire 2-nd information including each of hazard statuses of each of hazardous areas near the pedestrian and location information and velocity information of hazardous objects, by referring to images acquired by one or more smartphone cameras linked with the smartphone and the 1-st information; and
   (c) the smartphone instructing a control unit to calculate a degree of pedestrian safety of the pedestrian by referring to the 1-st information and the 2-nd information, and to transmit a hazard alert to the pedestrian via the smartphone, wherein
   at step (b), the smartphone instructs the detecting unit to (i) detect the hazardous objects near the pedestrian in each of the images by using a convolutional layer, a Region Proposal Network (RPN), and a Fully Connected (FC) layer in the detecting unit, and (ii) acquire the 2-nd information on the detected hazardous objects, by referring to calibration information related to a focal length of the one or more smartphone cameras and the 1-st information;
   wherein, at the step of (c), the smartphone instructs the control unit to determine the degree of pedestrian safety by additionally referring to 3-rd information, and
   wherein the 3-rd information includes information on surroundings of the pedestrian generated by the smartphone instructing the control unit to communicate with connected devices near the pedestrian that include a vehicle, a closed caption television (CCTV), another smartphone of another pedestrian, and a traffic signal all of which are near the pedestrian, wherein the connected devices are the hazardous objects.

4. The method of claim 3, wherein the 3-rd information includes (3_1)-st information and (3_2)-nd information,
wherein the (3_1)-st information includes location information and velocity information of a 1-st specific hazardous object included in both of a virtual viewing frustum of the phone cameras linked with the smartphone and a virtual viewing frustum of an external camera linked with the connected devices,
wherein the (3_2)-nd information includes location information and velocity information of a 2-nd specific hazardous object excluded from the virtual viewing frustum of the smartphone cameras linked with the smartphone but included in the virtual viewing frustum of the external camera linked with the connected devices, and
wherein the smartphone instructs the control unit to verify a reliability of the 2-nd information by referring to the (3___1)-st information, and acquire information on an undetected hazardous object by referring to the (3_2)-nd information.

5. The method of claim 3, wherein, at the step of (c), the smartphone instructs the control unit to generate information on a traffic light of interest of the pedestrian, by referring to (i) traffic light location information and traffic light status information near the pedestrian included in the 3-rd information, and (ii) the location information and the velocity information of the pedestrian included in the 1-st information, and to generate and transmit an additional traffic light notification to the pedestrian via the smartphone by referring to the information on the traffic light of interest.

6. The method of claim 3, wherein the 3-rd information includes (i) a location and a velocity of the vehicle near the pedestrian, (ii) locations and velocities of the hazardous objects near the pedestrian acquired by referring to the closed caption television (CCTV) near the pedestrian, (iii) a location and a velocity of said a another pedestrian, and (iv) traffic light location information and traffic light status information near the pedestrian.

7. The method of claim 1, wherein the smartphone, if an area, on the High Definition Map, corresponding to the images acquired by the smartphone cameras is detected as less than or equal to a threshold value by using the control unit, instructs the control unit to transmit an unavailability notification of detection to the pedestrian via the smartphone.

8. The method of claim 7, wherein the smartphone determines a cause of the area being less than or equal to the threshold value, by referring to at least part of occlusion information, on a blocking object interfering with a lens of the smartphone cameras, generated by a segmenting unit, and angle information on an angle between a normal vector defining a plane of movement of the pedestrian and a central axis of a virtual viewing frustum of the smartphone cameras in a 3D space whose center lies at the pedestrian, and transmits each of separate warnings according to each corresponding cause to the pedestrian via the smartphone.

9. The method of claim 1, wherein, at the step of (c), the smartphone instructs the control unit to determine probabilities of the degree of risk of collision between the pedestrian and the hazardous objects near the pedestrian within a threshold time by referring to the 1-st information and the 2-nd information, to thereby generate the degree of pedestrian safety.

10. The method of claim 9, wherein the smartphone instructs the control unit to transmit an additional notification giving a behavioral guide to the pedestrian for improving the degree of pedestrian safety via the smartphone.

11. The method of claim 9, wherein the smartphone instructs the control unit to (i) generate a pedestrian movement model capable of estimating a change of a moving velocity of the pedestrian, by referring to acceleration sensor information included in the 1-st information, (ii) calculate one or more probabilities of the pedestrian moving into each of nearby areas within the threshold time, by referring to the pedestrian movement model, (iii) generate a hazardous objects movement model capable of estimating changes of moving velocities of the hazardous objects, by referring to at least part of the 2-nd information, (iv) calculate one or more probabilities of the hazardous objects moving into each of nearby areas within the threshold time, by referring to the hazardous objects movement model, and (v) generate the degree of pedestrian safety by referring to the probabilities of the pedestrian and the probabilities of the hazardous objects.

12. The method of claim 1, wherein, at the step of (c), the smartphone instructs the control unit to determine whether the pedestrian will move into one of the hazardous areas by referring to the location information and the velocity information of the pedestrian, and information on the hazardous areas, included in the 1-st information and the 2-nd information, to thereby generate the degree of pedestrian safety.

13. The method of claim 12, wherein the smartphone instructs the control unit to (i) generate a pedestrian movement model capable of estimating a change of a moving velocity of the pedestrian, (ii) calculate one or more probabilities of the pedestrian moving into each of nearby areas, by referring to the pedestrian movement model, and (iii) generate the degree of pedestrian safety by referring to the probabilities of the pedestrian and whether each of the nearby areas corresponds to each of the hazardous areas.

14. A smartphone for providing an Advanced Pedestrian Assistance System to protect a pedestrian preoccupied with the smartphone, comprising:
a memory that stores instructions; and
a processor configured to execute the instructions to: perform processes of (I) instructing a locating unit to infer 1-st information including location information and velocity information of the pedestrian and by acquiring associated location information and velocity information of the smartphone, by referring to information acquired from a High Definition Map, Global Positioning system (GPS), and an acceleration sensor and a gyroscope sensor included in an Inertial Measurement Unit (IMU), (II) instructing a detecting unit to acquire 2-nd information including each of hazard statuses of each of hazardous areas near the pedestrian and location information and velocity information of hazardous objects, by referring to images acquired by one or more smartphone cameras linked with the smartphone and the 1-st information, and (Ill) instructing a control unit to calculate a degree of pedestrian safety of the pedestrian by referring to the 1-st information and the 2-nd information, and to transmit a hazard alert to the pedestrian via the smartphone, wherein
at the process of (II), the processor instructs the detecting unit to (i) detect the hazardous objects near the pedestrian in each of the images by using a convolutional layer a Region Proposal Network (RPN), and a Fully Connected (FC) layer in the detecting unit, and (ii) acquire the 2-nd information on the detected hazardous objects, by referring to calibration information related to a focal length of the smartphone cameras and the 1-st information;

wherein the processor further performs a process of:

(IV) instructing the control unit to transmit the 1-st information and the 2-nd information to connected devices near the pedestrian that include a vehicle, a closed caption television (CCTV), another smartphone of another pedestrian, and a traffic signal all of which are near the pedestrian, wherein the connected devices are the hazardous objects.

15. The smartphone of claim 14, wherein, at the process of (IV), the processor instructs the control unit to transmit the 1-st information and the 2-nd information to the connected devices near the pedestrian, to thereby allow the connected devices to behave in a direction of lowering a degree of risk of collision between the hazardous objects and the pedestrian, by referring to the acquired 1-st information and the acquired 2-nd information.

16. The smartphone of claim 14, wherein, at the process of (III), the processor instructs the control unit to determine the degree of pedestrian safety by additionally referring to 3-rd information, and wherein the 3-rd information includes information on surroundings of the pedestrian generated by the processor instructing the control unit to communicate with connected devices near the pedestrian that include a vehicle, a closed caption television (CCTV), another smartphone of another pedestrian, and a traffic signal all of which are near the pedestrian, wherein the connected devices are the hazardous objects.

17. The smartphone of claim 16, wherein the 3-rd information includes (3_1)-st information and (3_2)-nd information, wherein the (3_1)-st information includes location information and velocity information of a 1-st specific hazardous object included in both of a virtual viewing frustum of the smartphone cameras linked with the smartphone and a virtual viewing frustum of an external camera linked with the connected devices, wherein the (3_2)-nd information includes location information and velocity information of a 2-nd specific hazardous object excluded from the virtual viewing frustum of the smartphone cameras linked with the smartphone but included in the virtual viewing frustum of the external camera linked with the connected devices, and wherein the processor instructs the control unit to verify a reliability of the 2-nd information by referring to the (3_1)-st information, and acquire information on an undetected hazardous object by referring to the (3_2)-nd information.

18. The smartphone of claim 16, wherein, at the process of (III), the processor instructs the control unit to generate information on a traffic light of interest of the pedestrian, by referring to (i) traffic light location information and traffic light status information near the pedestrian included in the 3-rd information, and (ii) the location information and the velocity information of the pedestrian included in the 1-st information, and to generate and transmit an additional traffic light notification to the pedestrian via the smartphone by referring to the information on the traffic light of interest.

19. The smartphone of claim 16, wherein the 3-rd information includes (i) a location and a velocity of the vehicle near the pedestrian, (ii) locations and velocities of the hazardous objects near the pedestrian acquired by referring to the closed caption television (CCTV) near the pedestrian, (iii) a location and a velocity of said another pedestrian, and (iv) traffic light location information and traffic light status information near the pedestrian.

20. The smartphone of claim 14, wherein the processor, if an area, on the High Definition Map, corresponding to the images acquired by the smartphone cameras is detected as less than or equal to a threshold value by using the control unit, instructs the control unit to transmit an unavailability notification of detection to the pedestrian via the smartphone.

21. The smartphone of claim 20, wherein the processor determines a cause of the area being less than or equal to the threshold value, by referring to occlusion information, on a blocking object interfering with a lens of the smartphone cameras, generated by a segmenting unit, and angle information on an angle between a normal vector defining a plane of movement of the pedestrian and a central axis of a virtual viewing frustum of the smartphone cameras in a 3D space whose center lies at the pedestrian, and transmits each of separate warnings according to each corresponding cause to the pedestrian via the smartphone.

22. The smartphone of claim 14, wherein, at the process of (III), the processor instructs the control unit to determine probabilities of the degree of risk of collision between the pedestrian and the hazardous objects near the pedestrian within a threshold time by referring to the 1-st information and the 2-nd information, to thereby generate the degree of pedestrian safety.

23. The smartphone of claim 22, wherein the processor instructs the control unit to transmit an additional notification giving a behavioral guide to the pedestrian for improving the degree of pedestrian safety via the smartphone.

24. The smartphone of claim 22, wherein the processor instructs the control unit to (i) generate a pedestrian movement model capable of estimating a change of a moving velocity of the pedestrian, by referring to acceleration sensor information included in the 1-st information, (ii) calculate one or more probabilities of the pedestrian moving into each of nearby areas within the threshold time, by referring to the pedestrian movement model, (iii) generate a hazardous objects movement model capable of estimating changes of moving velocities of the hazardous objects, by referring to at least part of the 2-nd information, (iv) calculate one or more probabilities of the hazardous objects moving into each of nearby areas within the threshold time, by referring to the hazardous objects movement model, and (v) generate the degree of pedestrian safety by referring to the probabilities of the pedestrian and the probabilities of the hazardous objects.

25. The smartphone of claim 14, wherein, at the process of (III), the processor instructs the control unit to determine whether the pedestrian will move into one of the hazardous areas by referring to the location information and the velocity information of the pedestrian, and information on the hazardous areas, included in the 1-st information and the 2-nd information, to thereby generate the degree of pedestrian safety.

26. The smartphone of claim 25, wherein the processor instructs the control unit to (i) generate a pedestrian movement model capable of estimating a change of a moving velocity of the pedestrian, (ii) calculate one or more probabilities of the pedestrian moving into each of nearby areas, by referring to the pedestrian movement model, and (iii) generate the degree of pedestrian safety by referring to the probabilities of the pedestrian and whether each of the nearby areas corresponds to each of the hazardous areas.

* * * * *